(12) United States Patent  
Sato et al.

(10) Patent No.: US 8,518,301 B2
(45) Date of Patent: Aug. 27, 2013

(54) CARBON DIOXIDE REFORMING PROCESS (75) Inventors: Hideto Sato, Nagaokakyo (JP); Yoshinori Saito, Nagaokakyo (JP)

(73) Assignee: Murata Manufacturing Co., Ltd., Nagaokayo-Shi, Kyoto-fu (KR)

( * ) Notice: Subject to any disclaimer, the term of this patent is extended or adjusted under 35 U.S.C. 154(b) by 138 days.

(21) Appl. No.: 12/971,552

(22) Filed: Dec. 17, 2010

(65) Prior Publication Data
US 2011/0089378 A1 Apr. 21, 2011

Related U.S. Application Data

(63) Continuation-in-part of application No. PCT/JP2009/060426, filed on Jun. 8, 2009.

(30) Foreign Application Priority Data

Jul. 4, 2008 (JP) ................................ 2008-175500

(51) Int. Cl.
*C01B 3/38* (2006.01)
*C01B 3/24* (2006.01)

(52) U.S. Cl.
USPC ........................................ 252/373; 423/650

(58) Field of Classification Search
USPC ...................................................... 252/373
See application file for complete search history.

(56) References Cited

U.S. PATENT DOCUMENTS 3,522,024 A * 7/1970 Billings et al. ............... 48/214 A
5,733,514 A * 3/1998 Boucot et al. ................. 422/631

| 2006/0009353 | A1* | 1/2006 | Cai et al. | 502/341 |
| 2008/0021251 | A1* | 1/2008 | Iaccino et al. | 585/316 |
| 2008/0032887 | A1* | 2/2008 | Ratnasamy et al. | 502/335 |
| 2012/0074357 | A1* | 3/2012 | Sato et al. | 252/373 |

FOREIGN PATENT DOCUMENTS

| CN | 1552518 A | 12/2004 |
| JP | 6-031169 A | 2/1994 |
| JP | 8-231204 | 9/1996 |
| JP | 08231204 A | 9/1996 |
| JP | 09-168740 A | 6/1997 |
| JP | 9-168740 A | 6/1997 |
| JP | 2002-059006 A | 2/2002 |

(Continued)

OTHER PUBLICATIONS

Written Opinion of the International Searching Authority, mailed Aug. 18, 2009.
Verykios, Xenophon E.; "Catalytic dry reforming of natural gas for the production of chemicals and hydrogen"; International Journal of Hydrogen Energy 28 (2003), pp. 1045-1063.

(Continued)

*Primary Examiner* — Melvin C Mayes
*Assistant Examiner* — Kenneth Vaden
(74) *Attorney, Agent, or Firm* — Dickstein Shapiro LLP (57) ABSTRACT

A synthetic gas containing hydrogen and carbon monoxide is efficiently obtained by reacting a hydrocarbon feedstock gas with carbon dioxide under pressure, while suppressing carbon deposition. The pressure is preferably 3 atmospheres (0.304 MPa), and used is a carbon dioxide reforming catalyst that contains at least one alkaline earth metal carbonate a catalytic metal promoting the decomposition reaction of a hydrocarbon feedstock gas, at least one alkaline earth metal selected from the group consisting of Ca, Sr, and Ba, and a complex oxide containing at least one component selected from the group consisting of Ti, Al, Zr, Fe, W, and Mo, such as $ATiO_3$, $AAl_2O_4$, $AZrO_3$, $AFe_2O_4$, $A_3W_2O_9$, $A_2WO_5$, or $AMoO_4$, where A is at least one of Ca, Sr, and Ba.

14 Claims, 2 Drawing Sheets

(56) References Cited

FOREIGN PATENT DOCUMENTS

| | | |
|---|---|---|
| JP | 2003-505238 T | 2/2003 |
| JP | 2005-046808 A | 2/2005 |
| JP | 2005-199263 A | 7/2005 |
| JP | 2006-061760 A | 3/2006 |
| WO | WO-2006/137211 A1 | 12/2006 |
| WO | WO-2008/084785 A1 | 7/2008 |

OTHER PUBLICATIONS

Nagaoka, Katsutoshi et al.; "Modification of Co/TiO$_2$ for dry reforming of methane at 2 MPa by Pt, Ru or Ni"; Applied Catalysis A: General, vol. 268. 2004, pp. 151-158.

Omata, K. et al; "Strontium carbonate supported cobalt catalyst for dry reforming of methane under pressure"; Catalysis Communications, vol. 5, 2004, pp. 755-758.

* cited by examiner

CARBON DIOXIDE REFORMING PROCESS

This is a continuation-in-part of PCT/JP2009/060426, filed Jun. 8, 2009, the contents of which are hereby incorporated herein by reference.

TECHNICAL FIELD

The present invention relates to a carbon dioxide reforming process, and specifically, a carbon dioxide reforming process used for reforming a hydrocarbon feedstock gas in the presence of carbon dioxide to obtain a synthetic gas containing hydrogen and carbon monoxide.

BACKGROUND ART

Since carbon dioxide is a major cause of global warming, a reduction in its discharge and effective utilization of it have been regarded as urgent requirements in recent years.

In addition, despite being generated in the technical fields of petroleum refining, petroleum chemistry, and the like, various hydrocarbon gases cannot be always efficiently utilized as feedstock gases for various substances, and a method for converting hydrocarbon gases into more effective substances has been desired.

Under the circumstances described above, a method in which a saturated hydrocarbon, such as methane, functioning as a reducing agent, is reacted with carbon dioxide in the presence of a catalyst so as to realize into hydrogen and carbon monoxide which are industrially effective synthetic gases (carbon dioxide reforming of a hydrocarbon) is known.

As a catalyst used for carbon dioxide reforming of a hydrocarbon, a catalyst in which nickel, ruthenium, or rhodium is supported on a carrier such as alumina or silica is known (see Patent Documents 1 and 2).

However, carbon deposition is likely to occur on the catalyst when the catalyst in which nickel, ruthenium, or rhodium is supported on a carrier such as alumina or silica described above is used, and there is a problem in that the surface of the catalyst is covered by the deposited carbon and activity is decreased, and that the reaction vessel becomes clogged by the blocking of the space between catalyst grains.

In addition, in the synthesis of DME (dimethylether) and the step of manufacturing liquid fuel or alcohol by the OXO synthesis process that are considered as uses of the manufactured synthetic gas, the synthesis process is generally performed under pressurized conditions. Therefore, in order to omit the need for repressurizing the synthesis gas obtained by carbon dioxide reforming, it is desired that carbon dioxide reforming is also performed under pressurized conditions.

However, when the conventional catalyst in which nickel, ruthenium, or rhodium is supported on a carrier such as alumina or silica described above is used, operation under pressurized conditions causes more significant carbon deposition than the operation under atmospheric pressure conditions.

Patent Document 1: Japanese Patent Application Laid-Open No. 8-231204
Patent Document 2: Japanese Patent Application Laid-Open No. 9-168740

DISCLOSURE OF THE INVENTION

Problem to be Solved by the Invention

The present invention has been made in view of the above situation, and an object of the present invention is to provide a carbon dioxide reforming process in which a hydrocarbon gas is reacted with carbon dioxide under pressure so as to efficiently generate hydrogen and carbon monoxide (i.e., perform carbon dioxide reforming), while suppressing carbon deposition.

Means for Solving the Problem

In order to solve the above problems, the carbon dioxide reforming process of the present invention is a carbon dioxide reforming process which reforms a hydrocarbon feedstock gas by carbon dioxide and generates a synthetic gas comprising carbon monoxide and hydrogen, wherein A catalytic amount of a carbon dioxide reforming catalyst comprising a carbonate of at least one alkaline earth metal selected from the group consisting of Ca, Sr, and Ba, a catalytic metal promoting the decomposition reaction of a hydrocarbon feedstock gas, and a complex oxide comprising at least one component selected from the group consisting of Ti, Al, Zr, Fe, W, and Mo and at least one alkaline earth metal selected from the group consisting of Ca, Sr, and Ba is used, and carbon dioxide reforming of a hydrocarbon feedstock gas is performed under pressure conditions of 3 atmospheres (0.304 MPa) or more. In general, the carbonate can be about to weight percent of the catalyst, the complex oxide can be about to weight percent of the catalyst, and the catalytic metal can be about to weight percent of the catalyst, although other amounts can be used.

In the carbon dioxide reforming process of the present invention, it is desirable that the complex oxide is $ATiO_3$, $AAl_2O_4$, $AZrO_3$, $AFe_2O_4$, $A_3W_2O_9$, $A_2WO_5$, or $AMoO_4$ (wherein A is at least one alkaline earth metal selected from the group consisting of Ca, Sr, and Ba).

Further, it is desirable that the catalytic metal is at least one member selected from the group consisting of Ni, Rh, Ru, Ir, Pd, Pt, Re, Co, Fe, and Mo.

Advantages of the Invention

The carbon dioxide reforming process of the present invention performs carbon dioxide reforming of a hydrocarbon feedstock gas using a carbon dioxide reforming catalyst containing a carbonate of at least one alkaline earth metal selected from the group consisting of Ca, Sr, and Ba, a catalytic metal promoting the decomposition reaction of a hydrocarbon feedstock gas, and a complex oxide containing at least one component selected from the group consisting of Ti, Al, Zr, Fe, W, and Mo and at least one alkaline earth metal selected from the group consisting of Ca, Sr, and Ba. Therefore, even when the operation of carbon dioxide reforming is performed under pressure conditions of 3 atmospheres (0.304 MPa) or more, carbon deposition in the reforming step is suppressed, and carbon dioxide reforming can be efficiently performed.

That is, a hydrocarbon feedstock gas is subjected to carbon dioxide reforming under pressurized conditions using the catalyst described above, whereby the hydrocarbon can be reformed into carbon dioxide and hydrogen, while suppressing carbon deposition, more efficiently than the case of performing carbon dioxide reforming under atmospheric pressure conditions.

According to the present invention, a pressurized synthesis gas containing carbon monoxide and hydrogen can be extremely efficiently generated from a hydrocarbon feedstock gas. Moreover, the pressurized synthesis gas obtained by the carbon dioxide reforming process of the present invention can be particularly meaningfully used as a feedstock in the manufacture of a substance in which the synthesis process is performed under pressurized conditions, such as the synthesis of DME (dimethylether) and the manufacture of liquid fuel or alcohol by an OXO synthesis process.

The methane that is a hydrocarbon and carbon dioxide are supplied at a high temperature, for example, of 800° to 1,100° C., whereby the above-described catalyst used in the carbon dioxide reforming process of the present invention functions as a catalyst to cause the following reactions.

In the carbon dioxide reforming reaction of methane ($CH_4$), the decomposition reaction of $CH_4$ of formula and the reaction to generate CO of formula are advanced.

In the conventional catalysts using an oxide such as alumina or silica as a carrier, the reaction speed of CO generation tends to be slow as compared to that of $CH_4$, thereby generating carbon deposition.

On the other hand, the carbon dioxide reforming catalyst of the present invention has an effect to promote the reaction of CO generation compared to the conventional catalysts using an oxide such as alumina or silica as a carrier described above, and the carbon generated that is started and promoted primarily as a function of the catalytic metal, can be removed by the methane decomposition reaction. As a result, even when the carbon dioxide reforming is performed under pressurized conditions, the carbon deposition in the reforming step can be suppressed, and the carbon dioxide reforming can be efficiently performed. As a result, a pressurized synthesis gas containing carbon monoxide and hydrogen can be efficiently generated.

In addition, when a complex oxide represented by $ATiO_3$, $AAl_2O_4$, $AZrO_3$, $AFe_2O_4$, $A_3W_2O_9$, $A_2WO_5$, and $AMoO_4$ (wherein A is at least one alkaline earth metal selected from the group consisting of Ca, Sr, and Ba) (for example, $BaAl_2O_4$) is included as the complex oxide, sintering of the carbonate is suppressed, and the reaction converting a hydrocarbon feedstock gas and carbon dioxide into carbon monoxide and hydrogen can be promoted.

In the present invention, the type of the catalytic metal used for the carbon dioxide reforming catalyst is not particularly limited, and various metals may be used, however, when at least one member selected from the group consisting of Ni, Rh, Ru, Ir, Pd, Pt, Re, Co, Fe, and Mo is used, the carbon dioxide reforming reaction can be efficiently performed, and the present invention can be further carried into effect.

REFERENCE NUMERALS

| | |
|---|---|
| 1 | Reaction tube |
| 2 | Heater |
| 3 | Carbon dioxide reforming catalyst |
| 4 | Gas inlet of reaction tube |
| 5 | Gas outlet of reaction tube |
| 6 | Pressure regulator |

BEST MODE FOR CARRYING OUT THE INVENTION

Hereinafter, with reference to examples of the present invention, the features of the present invention will be further described in detail.

Example 1

As the catalysts used in the carbon dioxide reforming process of the present invention, the following carbon dioxide reforming catalysts A, B, and C were prepared.

Carbon Dioxide Reforming Catalyst A $BaCO_3$ and $TiO_2$ were weighed so as to have a molar ratio of 2.0:1.0, and further, NiO was added thereto and mixed therewith so as to be in an amount of 2% by weight.

Next, a binder was added to this mixture, and the resulting mixture was pelletized into spherical pellets having a diameter of 2 to 5 mm. The resulting granular pellets were fired under the conditions of 1,100° C. for 1 hour in the air, thereby obtaining a mixture of $Ba_2TiO_4$ and NiO.

This mixture was fired under the conditions of 700° C. for 1 hour in an air flow of 20% $CO_2$ and 80% $N_2$, thereby obtaining carbon dioxide reforming catalyst A with a molar ratio of $BaCO_3$ and $BaTiO_3$ of 1.0:1.0, and which was a mixture of $BaCO_3$, $BaTiO_3$, and NiO.

From the weight change of the sample before and after the firing and the result of XRD measurement, it was confirmed that all $Ba_2TiO_4$ was decomposed into $BaCO_3$ and $BaTiO_3$ in the mixture, and as a result, a catalyst that was the mixture with a molar ratio of $BaCO_3$ and $BaTiO_3$ of 1.0:1.0 was obtained.

At least part of NiO described above is reduced in the carbon dioxide reforming reaction step of a hydrocarbon feedstock gas so as to function as a catalytic metal promoting carbon dioxide reforming of a hydrocarbon feedstock gas.

Carbon Dioxide Reforming Catalyst B $SrCO_3$ and $TiO_2$ were weighed so as to have a molar ratio of 2.0:1.0, and further, NiO was added thereto and mixed therewith so as to be in an amount of 2% by weight.

Next, a binder was added to this mixture, and the resulting mixture was pelletized into spherical pellets having a diameter of 2 to 5 mm. The resulting granular pellets were fired under the conditions of 1,100° C. for 1 hour in the air, thereby obtaining a mixture of $Sr_2TiO_4$ and NiO.

This mixture was fired under the conditions of 700° C. for 1 hour in an air flow of 20% $CO_2$ and 80% $N_2$, thereby obtaining carbon dioxide reforming catalyst B with a molar ratio of $SrCO_3$ and $SrTiO_3$ of 1.0:1.0, and which was a mixture of $SrCO_3$ and $SrTiO_3$, and NiO.

From the weight change of the sample before and after the firing and the result of XRD measurement, it was confirmed that all $Sr_2TiO_4$ was decomposed into $SrCO_3$ and $SrTiO_3$ in the mixture, and as a result, a catalyst that was the mixture with a molar ratio of $SrCO_3$ and $SrTiO_3$ of 1.0:1.0 was obtained.

At least part of NiO described above is reduced in the carbon dioxide reforming reaction step of a hydrocarbon feedstock gas so as to function as a catalytic metal promoting carbon dioxide reforming of a hydrocarbon feedstock gas.

Carbon Dioxide Reforming Catalyst C $BaCO_3$ and $Al_2O_3$ were weighed so as to have a molar ratio of 3.0:1.0, and further, NiO was added thereto and mixed therewith so as to be in an amount of 2% by weight.

Next, a binder was added to this mixture, and the resulting mixture was pelletized into spherical pellets having a diameter of 2 to 5 mm. The resulting granular pellets were fired under the conditions of 1,100° C. for 1 hour in the air, thereby obtaining a mixture of $Ba_3Al_2O_6$ and NiO.

This mixture was fired under the conditions of 700° C. for 1 hour in an air flow of 20% $CO_2$ and 80% $N_2$, thereby obtaining carbon dioxide reforming catalyst C that was a mixture of $BaCO_3$, $BaAl_2O_4$, and NiO.

From the weight change of the sample before and after the firing and the result of XRD measurement, it was confirmed that all $Ba_3Al_2O_6$ was decomposed into $BaCO_3$ and $BaAl_2O_4$ in the mixture, and as a result, a catalyst that was the mixture with a molar ratio of $BaCO_3$ and $BaAl_2O_4$ of 2.0:1.0 was obtained.

At least part of NiO described above is reduced in the carbon dioxide reforming reaction step of a hydrocarbon feedstock gas so as to function as a catalytic metal promoting carbon dioxide reforming of a hydrocarbon feedstock gas.

Carbon Dioxide Reforming Catalyst D for Comparison

For comparison, carbon dioxide reforming catalyst D which includes an alkaline earth metal, a complex oxide containing at least one component selected from the group consisting of Ti, Al, Zr, Fe, W, and Mo and a catalytic metal but does not include a carbonate of an alkaline earth metal was prepared as follows.

$BaCO_3$ and $TiO_2$ were weighed so as to have a molar ratio of 1.0:1.0, and further, NiO was added thereto and mixed therewith in an amount of 2% by weight.

Next, a binder was added to this mixture, and the resulting mixture was pelletized into spherical pellets having a diameter of 2 to 5 mm. The resulting granular pellets were fired under the conditions of 1,000° C. for 1 hour in the air, thereby obtaining carbon dioxide reforming catalyst (catalyst for comparison) D that was a mixture of $BaTiO_3$ and NiO.

From the weight change of the granular pellets before and after the firing and the result of XRD measurement, it was confirmed that the resulting carbon dioxide reforming catalyst D was the mixture of $BaTiO_3$ and NiO.

Commercially Available Methane Reforming Catalyst E

For comparison, a commercially available methane reforming catalyst E containing NiO and alumina as primary contents was used.

Carbon Dioxide Reforming Catalyst F for Comparison

Furthermore, for comparison, carbon dioxide reforming catalyst F which includes a carbonate of an alkaline earth metal and a catalytic metal but does not include an alkaline earth metal and a complex oxide containing at least one component selected from the group consisting of Ti, Al, Zr, Fe, W, and Mo was prepared as follows.

NiO was added to $BaCO_3$ and mixed therewith at a rate so as to be in an amount of 2% by weight.

Next, a binder was added to this mixture, and the resulting mixture was pelletized into spherical pellets having a diameter of 2 to 5 mm. These granular pellets were fired under the conditions of 900° C. for 1 hour in the air, thereby obtaining carbon dioxide reforming catalyst (catalyst for comparison) F that was a mixture of $BaCO_3$ and NiO.

From the weight change of the granular pellets before and after the firing and the result of XRD measurement, it was confirmed that the resulting carbon dioxide reforming catalyst F was the mixture of $BaCO_3$ and NiO.

Carbon Dioxide Reforming Test and Evaluation of Properties

Using carbon dioxide reforming catalysts A to C meeting the requirements of the present invention, prepared as described above, and catalysts D and E for comparative examples, a carbon dioxide reforming test of a hydrocarbon feedstock gas was performed at operation pressures of atmospheric pressure (0.101 MPa), 3 atmospheres (0.304 MPa), 5 atmospheres (0.507 MPa), and 8 atmospheres (0.811 MPa).

Figure 1:
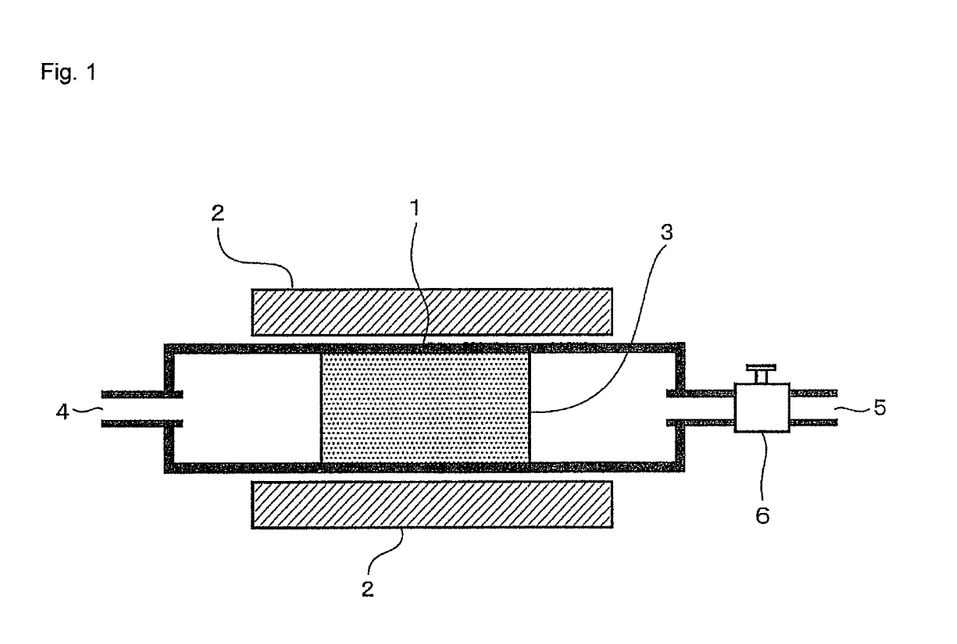
FIG. 1 is a view showing a constitution of a test apparatus used for carbon dioxide reforming test in examples of the present invention.

The carbon dioxide reforming test was performed using a test apparatus as shown in FIG. 1. This test apparatus comprises a stainless steel reaction tube 1 with an inner diameter of 22 mm and a length of 300 mm, which is externally provided with a heater 2, a gas inlet 4 for providing a gas into the reaction tube 1, a gas outlet 5 for discharging a gas from the reaction tube 1, and a pressure regulator 6 for regulating the pressure in the reaction tube.

Reforming Test at Atmospheric Pressure ((0.101 MPa)

Into the reaction tube 1 in the test apparatus of FIG. 1, 10 cc of carbon dioxide reforming catalysts A to E described above were charged (shown by Symbol 3 in FIG. 1), and the reaction tube 1 was heated to 900° C. by the heater 2, and a mixed gas containing methane and carbon dioxide ($CH_4:CO_2=1:1$ (volume ratio)) was supplied from the inlet 4 of the reaction tube 1 at a rate of 40 NL/h as a feedstock gas for 8 hours.

Moreover, the gas which was discharged from the outlet of the reaction tube was introduced into an analytical apparatus, and the gas concentration was determined, thereby calculating the conversion rates of $CH_4$ and $CO_2$. After the test was finished, the carbon dioxide reforming catalyst was taken out and then sieved, and thus the deposited carbon was recovered.

Reforming Test Under Pressure (3 Atmospheres, 5 Atmospheres, and 8 Atmospheres)

Into the reaction tube 1 in a test apparatus of FIG. 1, 10 cc of carbon dioxide reforming catalysts A to E described above (shown by Symbol 3 in FIG. 1) were charged, and the reaction tube 1 was heated to 900° C. by the heater 2, while the pressure in the reaction tube 1 was regulated by the pressure regulator 6 so as to be the predetermined pressures (3 atmospheres (0.304 MPa), 5 atmospheres (0.507 MPa), and 8 atmospheres (0.811 MPa)), and a mixed gas containing methane and carbon dioxide ($CH_4:CO_2=1:1$ (volume ratio)) was supplied from the inlet 4 of the reaction tube 1 at a rate of 40 NL/h as a feedstock gas for 8 hours.

The gas which was discharged from the outlet of the reaction tube during test was introduced into an analytical apparatus, and the gas concentration was determined, thereby calculating the conversion rates of $CH_4$ and $CO_2$. After the test was finished, the carbon dioxide reforming catalyst was taken out and then sieved, and thus the deposited carbon was recovered.

Result and Evaluation

The results of the carbon dioxide reforming test, i.e., the methane conversion rate, the carbon dioxide conversion rate, and the amount of deposited carbon, in a case where carbon dioxide reforming catalysts A, B, and C are used, are shown in Tables 1 to 3.

The methane conversion rate refers to the rate of methane ($CH_4$) subjected to the reforming step, which reacted with carbon dioxide to convert to carbon monoxide and hydrogen.

In addition, the $CO_2$ conversion rate refers to the rate of carbon dioxide ($CO_2$) that was used for the reforming among carbon dioxide ($CO_2$) subjected to the reforming step.

In addition, the amount of deposited carbon refers to the amount of carbon recovered by taking out and sieving the carbon dioxide reforming catalyst after completion of the test.

Table 1 shows the result of the carbon dioxide reforming test using carbon dioxide reforming catalyst A, and Table 2 shows the result of the carbon dioxide reforming test using carbon dioxide reforming catalyst B, and Table 3 shows the result of the carbon dioxide reforming test using carbon dioxide reforming catalyst C.

Figure 2:
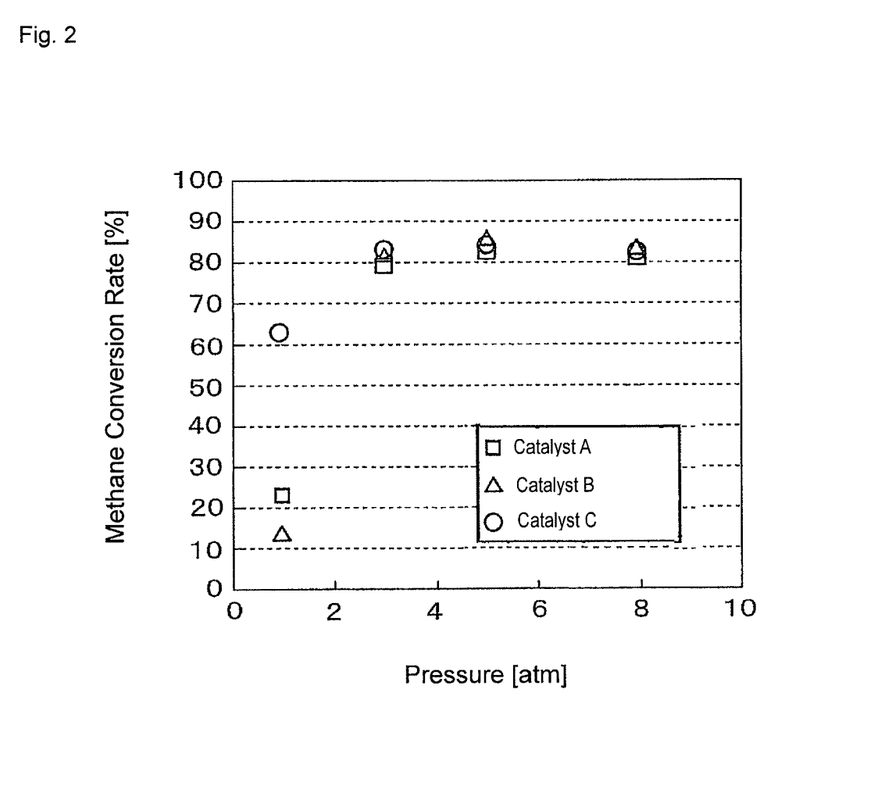
FIG. 2 is a view showing the relationship between the pressure in a reaction tube and the methane conversion rate in carbon dioxide reforming test performed in examples of the present invention.

Further, FIG. 2 shows the relationship between the pressure in a reaction tube and the methane conversion rate.

TABLE 1

| Pressure in Reaction Tube | Methane Conversion Rate [%] | $CO_2$ Conversion Rate [%] | Deposited Carbon [g] |
|---|---|---|---|
| 1 Atmosphere | 22.7 | 36.8 | 0 |
| 3 Atmospheres | 80.4 | 89.8 | 0 |
| 5 Atmospheres | 84.0 | 91.7 | 0 |
| 8 Atmospheres | 80.9 | 89.8 | 0 |

TABLE 2

| Pressure in Reaction Tube | Methane Conversion Rate [%] | $CO_2$ Conversion Rate [%] | Deposited Carbon [g] |
|---|---|---|---|
| 1 Atmosphere | 14.8 | 21.1 | 0 |
| 3 Atmospheres | 83.3 | 90.5 | 0 |
| 5 Atmospheres | 86.5 | 91.1 | 0 |
| 8 Atmospheres | 82.3 | 90.8 | 0 |

TABLE 3

| Pressure in Reaction Tube | Methane Conversion Rate [%] | $CO_2$ Conversion Rate [%] | Deposited Carbon [g] |
|---|---|---|---|
| 1 Atmosphere | 61.3 | 77.8 | 0 |
| 3 Atmospheres | 84.8 | 90.6 | 0 |
| 5 Atmospheres | 84.6 | 90.1 | 0 |
| 8 Atmospheres | 81.5 | 89.9 | 0 |

When carbon dioxide reforming was performed using carbon dioxide reforming catalysts A, B, and C, which meet the requirements of the present invention, Tables 1 to 3 and FIG. 2 confirm that the conversion rates of $CH_4$ and $CO_2$ were higher when the carbon dioxide reforming was performed under a pressure of 3 atmospheres (0.304 MPa) than where carbon dioxide reforming was performed at atmospheric pressure (0.101 MPa). It is considered that the increase in the methane conversion rate to 80% or more is of great significance.

In addition, it was confirmed that when carbon dioxide reforming catalysts A, B, and C were used, carbon deposition was not found under any pressure conditions from atmospheric pressure (0.101 MPa) to 8 atmospheres (0.811 MPa).

On the other hand, when comparative example carbon dioxide reforming catalyst D was used in the reforming test at atmospheric pressure, more than 5 g of carbon deposition was found and when the pressure was increased, the amount of carbon deposition markedly increased.

When comparative example carbon dioxide reforming catalyst F was used, carbon deposition was not found in the reforming test at atmospheric pressure but the conversion rates of $CH_4$ and $CO_2$ were both low as few %, and markedly poor as compared that using catalysts A to C. Therefore, the reforming test under pressure was not performed.

Based on the comparison between catalyst F and catalyst D, it is considered that a carbonate of an alkaline earth metal has catalytic functions that promote the reaction.

It is considered that the reason why the properties of catalyst F are poorer than those of catalysts A to C is that sintering proceeded during reaction with only the carbonate of an alkaline earth metal, and the catalytic function of Ni could not be sufficiently exhibited.

On the other hand, in catalysts A to C, since a complex oxide containing an alkaline earth metal and Ti or Al fulfills the function of preventing sintering of the alkaline earth metal carbonate, the carbon dioxide reforming reaction generating carbon monoxide and hydrogen from a hydrocarbon feedstock gas and carbon dioxide can be promoted.

In addition, it has been confirmed that the complex oxide having a function of preventing sintering of an alkaline earth metal carbonate includes those containing at least any of Zr, Fe, W, and Mo, specifically, $AZrO_3$, $AFe_2O_4$, $A_3W_2O_9$, $A_2WO_5$, or $AMoO_4$ (wherein A is at least one alkaline earth metal selected from the group consisting of Ca, Sr, and Ba), in addition to those containing Ti or Al. The mixture of a carbonate of an alkaline earth metal and these complex oxides can be obtained by allowing another complex oxide, which is a precursor (specifically, $A_2ZrO_4$, $A_2Fe_2O_5$, $A_2WO_5$, $A_3WO_6$, or $A_2MoO_5$), to absorb a carbonate gas, as is the case of catalysts A to C.

When commercially available methane reforming catalyst E was used, the reaction tube because clogged by deposited carbon in about 1 hour from the start of the test at atmospheric pressure, and the test was stopped. Also, since the carbon deposition was significant even at atmospheric pressure, the test under pressure was not performed.

From the results described above, it has been confirmed that a carbon dioxide reforming catalyst containing a carbonate of at least one alkaline earth metal selected from the group consisting of Ca, Sr, and Ba, a catalytic metal promoting the decomposition reaction of a hydrocarbon feedstock gas, at least one alkaline earth metal selected from the group consisting of Ca, Sr, and Ba, and a complex oxide containing at least one component selected from the group consisting of Ti, Al, Zr, Fe, W, and Mo is used, carbon dioxide reforming can be performed under pressure, while suppressing and preventing carbon deposition, and a high reaction conversion rate can be realized.

In the synthesis of DME (dimethylether) and manufacturing liquid fuel or alcohol using an OXO synthesis process, which are uses of a synthetic gas containing carbon monoxide and hydrogen obtained by carbon dioxide reforming, it is generally known that the higher the synthesis pressure, the more the conversion rate increases. Since it is possible to obtain a pressurized synthetic gas according to the present invention, the synthetic gas containing carbon monoxide and hydrogen obtained by practicing the present invention can be meaningfully used particularly for these uses.

The present invention is not limited to the above examples, and the operation conditions in the carbon dioxide reforming step, composition of a carbon dioxide reforming catalyst, for example, the types and content rates of an alkaline earth metal, complex oxide and catalytic metal constituting a carbon dioxide reforming catalyst, and the like may be variously changed and modified within the scope of the present invention.

INDUSTRIAL APPLICABILITY

According to the present invention, carbon dioxide reforming is performed under pressure, while suppressing and preventing carbon deposition, and a high reaction conversion rate can be realized. Therefore, the present invention can be suitably used in the technology of manufacturing a synthetic gas containing hydrogen and carbon monoxide from a hydrocarbon feedstock gas by carbon dioxide reforming, particularly, the technical field of manufacturing substances such as a liquid fuel manufactured using DME or an oxo method, in which it is desired that a reaction process in the manufacturing step is performed under pressure, to provide a pressurized synthetic gas.

The invention claimed is:

1. A carbon dioxide reforming process comprising reforming a hydrocarbon feedstock gas with carbon dioxide in the presence of a carbon dioxide reforming catalyst comprising a catalytic metal promoting the decomposition reaction of the hydrocarbon feedstock gas, and a combination of an alkaline earth metal carbonate selected from the group consisting of $BaCO_3$ and $SrCO_3$, and a complex oxide selected from the group consisting of $BaTiO_3$, $SrTiO_3$, and $BaAl_2O_4$, wherein the alkaline earth metal of the carbonate and the complex oxide is the same, at a pressure of 3 atmospheres or more, thereby generating a synthetic gas comprising carbon monoxide and hydrogen.

2. The carbon dioxide reforming process according to claim 1, wherein the alkaline earth metal carbonate is $BaCO_3$ and the complex oxide is $BaTiO_3$.

3. The carbon dioxide reforming process according to claim 2, wherein the catalytic metal is at least one member selected from the group consisting of Ni, Rh, Ru, Ir, Pd, Pt, Re, Co, Fe, and Mo.

4. The carbon dioxide reforming process according to claim 3, wherein the feedstock gas comprises methane.

5. The carbon dioxide reforming process according to claim 4, wherein the catalytic metal is Ni.

6. The carbon dioxide reforming process according to claim 1, wherein the alkaline earth metal carbonate is $BaCO_3$ and the complex oxide is the complex oxide is $BaAl_2O_4$.

7. The carbon dioxide reforming process according to claim 6, wherein the catalytic metal is at least one member selected from the group consisting of Ni, Rh, Ru, Ir, Pd, Pt, Re, Co, Fe, and Mo.

8. The carbon dioxide reforming process according to claim 7, wherein the feedstock gas comprises methane.

9. The carbon dioxide reforming process according to claim 8, wherein the catalytic metal is Ni.

10. The carbon dioxide reforming process according to claim 9, wherein the alkaline earth metal carbonate is $SrCO_3$ and the complex oxide is $SrTiO_3$.

11. The carbon dioxide reforming process according to claim 10, wherein the catalytic metal is at least one member selected from the group consisting of Ni, Rh, Ru, Ir, Pd, Pt, Re, Co, Fe, and Mo.

12. The carbon dioxide reforming process according to claim 11, wherein the feedstock gas comprises methane.

13. The carbon dioxide reforming process according to claim 12, wherein the catalytic metal is Ni.

14. The carbon dioxide reforming process according to claim 1, wherein the pressure of 3 to 8 atmospheres.

* * * * *

UNITED STATES PATENT AND TRADEMARK OFFICE
CERTIFICATE OF CORRECTION

PATENT NO.        : 8,518,301 B2
APPLICATION NO.   : 12/971552
DATED             : August 27, 2013
INVENTOR(S)       : Sato et al.

It is certified that error appears in the above-identified patent and that said Letters Patent is hereby corrected as shown below:

On the title page, Item [73] Assignee, please delete "Nagaokayo-Shi, Kyoto-fu (KR)" and replace it with \*\*\*Nagaokakyo-Shi, Kyoto-fu (JP)\*\*\*

Signed and Sealed this
Twenty-sixth Day of November, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.        : 8,518,301 B2                                   Page 1 of 1
APPLICATION NO.   : 12/971552
DATED             : August 27, 2013
INVENTOR(S)       : Sato et al.

It is certified that error appears in the above-identified patent and that said Letters Patent is hereby corrected as shown below:

On the title page, Item [63] Related U.S. Application Data, please delete "Continuation-in-part" and replace with \*\*\*Continuation\*\*\*.

Signed and Sealed this
Eighth Day of July, 2014

Michelle K. Lee
*Deputy Director of the United States Patent and Trademark Office*